(12) United States Patent
Deschenaux et al.

(10) Patent No.: US 8,701,529 B2
(45) Date of Patent: Apr. 22, 2014

(54) METHOD OF GROOVING SUPERALLOYS AND CUTTING INSERT THEREFOR

(75) Inventors: Patrick Deschenaux, Le Crêtprès-Semsales (CH); Kurt Brenner, Rastatt (DE)

(73) Assignee: Iscar, Ltd., Tefen (IL)

( * ) Notice: Subject to any disclaimer, the term of this patent is extended or adjusted under 35 U.S.C. 154(b) by 968 days.

(21) Appl. No.: 12/685,058

(22) Filed: Jan. 11, 2010

(65) Prior Publication Data

US 2010/0175519 A1    Jul. 15, 2010

(30) Foreign Application Priority Data

Jan. 11, 2009   (IL) .......................................... 196439

(51) Int. Cl.
 *B23B 27/10*   (2006.01)
(52) U.S. Cl.
 USPC ............... 82/1.11; 407/11; 407/117; 407/113
(58) Field of Classification Search
 USPC ........ 407/2, 6, 11, 113–115, 117–119; 82/50, 82/52, 1.11
 IPC ..................................... B23C 5/28; B23B 27/10
 See application file for complete search history.

(56) References Cited

U.S. PATENT DOCUMENTS

| | | | | |
|---|---|---|---|---|
| 160,161 | A | * | 2/1875 | Clay ................................ 407/11 |
| 3,077,802 | A | * | 2/1963 | Phillip ............................ 82/173 |
| 3,254,392 | A | * | 6/1966 | Novkov ......................... 407/113 |
| 3,364,544 | A | * | 1/1968 | Urbanic ......................... 407/107 |
| 3,486,378 | A | * | 12/1969 | Carlson .......................... 374/127 |
| 3,673,653 | A | * | 7/1972 | Kaser ............................... 407/2 |
| 3,720,120 | A | * | 3/1973 | Cutler ............................. 82/118 |
| 3,889,520 | A | * | 6/1975 | Stoferle et al. ................. 73/37.5 |
| 3,971,114 | A | * | 7/1976 | Dudley .......................... 407/120 |
| 4,403,015 | A | * | 9/1983 | Nakai et al. .................... 428/565 |
| 4,535,216 | A | * | 8/1985 | Cassidenti ....................... 219/68 |

(Continued)

FOREIGN PATENT DOCUMENTS

| | | | |
|---|---|---|---|
| DE | 3004166 | A * | 8/1980 |
| DE | 3740814 |  | 6/1989 |

(Continued)

OTHER PUBLICATIONS

International Search Report dated Mar. 30, 2010 issued in corresponding Int'l Application—No. PCT/IL2009/001198 filed Dec. 17, 2009.

(Continued)

*Primary Examiner* — Andrea Wellington
*Assistant Examiner* — Sara Addisu
(74) *Attorney, Agent, or Firm* — Womble Carlyle

(57) ABSTRACT

A method of grooving a work-piece of superalloy uses a grooving cutting insert at least partially covered with a Cubic Boron Nitride (CBN) layer and having one or more interior ducts formed therein which open out to the insert's rake face at one or more corresponding openings. One or more coolant fluid streams, conveyed via these interior ducts at a pressure of no less than 200 bars, are directed upwardly and outwardly toward an interaction area between a cutting edge of the cutting insert and the work-piece, to thereby limit lengths of work-piece chips created during the grooving operation. The openings of the cutting insert's interior ducts may be located between 0.5-3.0 mm from the insert's cutting edge.

13 Claims, 3 Drawing Sheets

(56) References Cited

U.S. PATENT DOCUMENTS

| | | | |
|---|---|---|---|
| 4,621,547 A | | 11/1986 | Yankoff |
| 4,720,216 A | * | 1/1988 | Smith .......................... 407/113 |
| 4,731,303 A | * | 3/1988 | Hirano et al. ................. 428/700 |
| 4,791,840 A | * | 12/1988 | De Rosier et al. ............. 82/1.11 |
| 4,848,198 A | * | 7/1989 | Royal et al. ................... 82/1.11 |
| 5,139,372 A | * | 8/1992 | Tanabe et al. ................. 407/118 |
| 5,148,728 A | | 9/1992 | Mazurkiewicz |
| 5,237,894 A | | 8/1993 | Lindke |
| 5,346,335 A | | 9/1994 | Harpaz et al. |
| 5,388,487 A | * | 2/1995 | Danielsen ...................... 82/158 |
| 5,639,285 A | * | 6/1997 | Yao et al. ........................ 51/307 |
| 5,718,156 A | * | 2/1998 | Lagrolet et al. ................ 82/1.11 |
| 5,761,974 A | | 6/1998 | Wang et al. |
| 5,775,854 A | * | 7/1998 | Wertheim ....................... 407/11 |
| 5,813,105 A | | 9/1998 | Littecke et al. |
| 5,829,924 A | * | 11/1998 | Oshnock et al. .............. 407/110 |
| 5,901,623 A | * | 5/1999 | Hong ............................... 82/50 |
| 5,993,297 A | | 11/1999 | Hyatt et al. |
| 6,026,719 A | * | 2/2000 | Li ................................ 82/1.11 |
| 6,045,300 A | * | 4/2000 | Antoun ........................... 407/11 |
| 6,053,669 A | * | 4/2000 | Lagerberg ....................... 407/11 |
| 6,146,064 A | * | 11/2000 | Flolo .............................. 407/11 |
| 6,447,218 B1 | * | 9/2002 | Lagerberg ...................... 407/114 |
| 6,471,448 B1 | * | 10/2002 | Lagerberg .......................... 407/2 |
| 6,634,835 B1 | * | 10/2003 | Smith ............................. 407/11 |
| 6,705,805 B2 | * | 3/2004 | Lagerberg ....................... 407/11 |
| 6,769,335 B2 | * | 8/2004 | Kaminski ...................... 82/1.11 |
| 6,843,620 B2 | * | 1/2005 | Inayama ......................... 407/114 |
| 6,957,933 B2 | * | 10/2005 | Pachao-Morbitzer et al. . 407/11 |
| 7,252,024 B2 | * | 8/2007 | Zurecki et al. ................. 82/1.11 |
| 7,611,310 B2 | * | 11/2009 | Isaksson ........................ 407/11 |
| 7,802,947 B2 | * | 9/2010 | Endres .......................... 407/113 |
| 7,934,891 B2 | * | 5/2011 | Jonsson et al. ............... 407/114 |
| 7,955,032 B2 | * | 6/2011 | Nelson .......................... 407/113 |
| 7,959,384 B2 | * | 6/2011 | Breisch ......................... 407/110 |
| 7,963,729 B2 | * | 6/2011 | Prichard et al. ................ 407/11 |
| 8,007,208 B2 | * | 8/2011 | Noureddine .................... 407/47 |
| 2001/0007215 A1 | * | 7/2001 | Murata et al. .................... 83/16 |
| 2003/0110781 A1 | * | 6/2003 | Zurecki et al. .................... 62/64 |
| 2003/0223831 A1 | * | 12/2003 | Viens et al. ..................... 408/60 |
| 2006/0243107 A1 | * | 11/2006 | Mann et al. .................... 82/1.11 |
| 2007/0160843 A1 | * | 7/2007 | Martensson et al. .......... 428/408 |
| 2009/0320655 A1 | * | 12/2009 | Grant ............................... 82/50 |
| 2010/0272529 A1 | * | 10/2010 | Rozzi et al. ..................... 408/56 |
| 2011/0027024 A1 | * | 2/2011 | Prichard et al. ................ 407/11 |
| 2011/0299944 A1 | * | 12/2011 | Hofermann ..................... 407/11 |
| 2012/0082518 A1 | * | 4/2012 | Woodruff et al. ............... 407/11 |
| 2012/0087746 A1 | * | 4/2012 | Fang et al. ...................... 407/11 |

FOREIGN PATENT DOCUMENTS

| | | | |
|---|---|---|---|
| DE | 102006035182 A1 | * | 1/2008 |
| EP | 599393 A1 | * | 6/1994 |
| FR | 2244590 A | * | 5/1975 |
| JP | 56069007 A | * | 6/1981 |
| JP | 59175903 A | * | 10/1984 |
| JP | 60127904 A | * | 7/1985 |
| JP | H02-167606 | | 6/1990 |
| JP | 03 033005 | | 4/1991 |
| JP | 10094904 A | * | 4/1998 |
| JP | 2001198708 A | * | 7/2001 |
| JP | 2001287134 A | * | 10/2001 |
| JP | 2006088297 | | 4/2006 |
| JP | 2008238342 A | * | 10/2008 |
| SU | 1342690 | | 10/1987 |

OTHER PUBLICATIONS

Official Action dated Apr. 18, 2012 issued in Israeli counterpart application No. 196439.

Bewilogua, K. et al, "Growth and characterization of thick cBN coatings on silicon and tool substrates," *Thin Solid Films*, Dec. 22, 2004, vol. 496-470, pp. 86-91—Abstract only.

Official Action dated Nov. 5, 2013 issued in Japanese counterpart application (No. 2011-544963).

English Translation of Official Action dated Nov. 5, 2013 issued in Japanese counterpart application (No. 2011-544963).

* cited by examiner

METHOD OF GROOVING SUPERALLOYS AND CUTTING INSERT THEREFOR

FIELD OF THE INVENTION

The present invention relates to a method of machining superalloys, for example, Inconel, and to a cutting insert for performing the method.

BACKGROUND OF THE INVENTION

Superalloys have been used in the metal industry for many years. A superalloy or a high-performance alloy is a metal alloy that exhibits excellent mechanical strength and creep resistance, e.g., at high temperatures, high surface stability, and high resistance to corrosion and oxidation. Superalloys typically have an austenitic, face-centered, cubic crystal structure. Alloying elements of superalloys usually include nickel, cobalt, or nickel-iron. Superalloy development relies on chemical and process innovations, and is driven primarily by the aerospace industry and by power industries such as the industrial gas-turbine and marine-turbine industries.

Examples of superalloys are Hasteloy, Waspaloy, Rene alloys (e.g., Rene 41, Rene 80, Rene 95), Haynes alloys, Incoloy, single crystal alloys, and Inconel, which includes a family of austenitic, nickel-based superalloys, typically used in high temperature applications.

Inconel, as with some other superalloys, includes oxidation and corrosion resistant materials that perform well under extreme conditions. For example, when heated Inconel forms a thick, stable, passivating oxide layer that protects its surface from a plurality of undesired effects. Therefore, Inconel retains its strength over a wide range of temperatures and is attractive for use in high temperature applications, whereas other materials such as aluminum or steel perform unsatisfactorily in such applications.

Nevertheless, Inconel and other superalloys are highly difficult to shape and machine, e.g., due to their rapid work-hardening during the machining process. For example, after completion of a first machine pass on a work-piece of Inconel, the rapid work-hardening causes, in subsequent machine passes, undesired plastic and elastic deformations of various areas of the work-piece that come into interaction with the cutting tool.

A present solution for overcoming the above-mentioned disadvantages includes supplying coolant fluid provided by an external adaptor, with a pressure of approximately 70-80 bars, on the general cutting area. The applied coolant fluid contributes to expel heat generated in the machining process. However, the present solution including providing of coolant fluid, for example, using known cemented carbide cutting inserts, limits the cutting speed ($V_c$) of the work-piece to approximately 40-60 meters per minute, which is a relatively limited cutting speed, compared to cutting speeds of other cutting operations. For example, the low cutting speed leads to high machining costs and thus to high manufacturing costs.

It is the object of the present invention to provide a machining method, and a cutting insert to perform the machining method, which significantly reduce or overcome the aforementioned disadvantages.

SUMMARY OF THE INVENTION

Embodiments of the invention include a method of grooving a work-piece of superalloy, and/or a cutting insert for performing the method.

In some embodiments, for example, at least a portion of the cutting insert, e.g., at least a cutting edge of the cutting insert, is covered with a Cubic Boron Nitride (CBN) layer such as a Polycrystalline CBN (PCBN) layer, and the cutting insert includes one or more interior ducts formed therein. The method includes, for example, directing coolant fluid directly on an area of interaction of the cutting edge with the work-piece, wherein the coolant fluid is conveyed to the interaction area by the one or more interior ducts. The coolant fluid egresses the interior ducts through respective one or more openings formed in a rake face of the cutting insert, the openings being in the proximity of the interaction area. The coolant fluid is directed through the openings and directly on the interaction area with a pressure of no less than 200 bars.

In some embodiments, for example, a combination, or a partial combination of the following—covering the cutting insert with the CBN layer, directing coolant fluid directly on the interaction area through the interior ducts, and the proximity of the interior ducts to the interaction area—provides a significantly improved performance of grooving superalloys, compared to the prior art. By virtue of this combination or partial combination, the method may include grooving an Inconel work-piece at cutting speeds ($V_c$s) of 200-500 meters per minute, achieving good to excellent surface quality and chip formation, e.g., achieving formation of chips in the length range of 1-5 millimeters. These improved cutting speeds achieved using the method, significantly exceed, i.e., by tens to hundreds of percents, the maximal cutting speed of Inconel that is obtainable in the prior art. The method thereby introduces significant reduction in costs of machining Inconel and other superalloys.

BRIEF DESCRIPTION OF THE DRAWINGS

For a better understanding of the present invention and to show how the same may be carried out in practice, reference will now be made to the accompanying drawings, in which.

Figure 1:
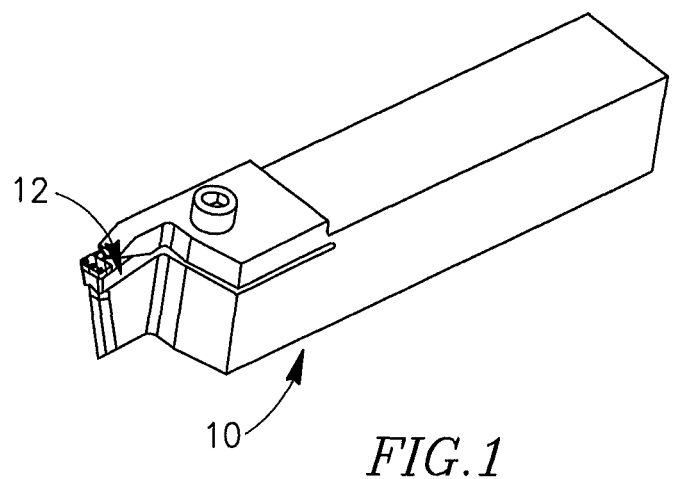
FIG. 1 is a perspective view of a cutting tool, having a cutting insert releasably retained therein, in accordance with the present invention.
Figure 2:
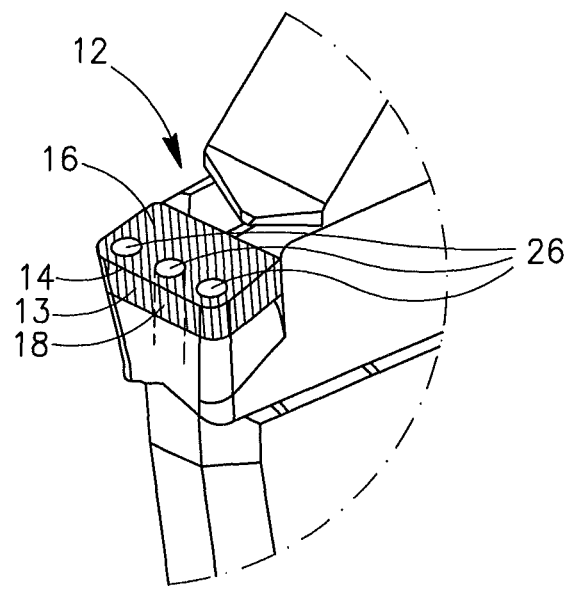
FIG. 2 is a perspective view of a cutting portion of the cutting tool of FIG. 1.
Figure 3:
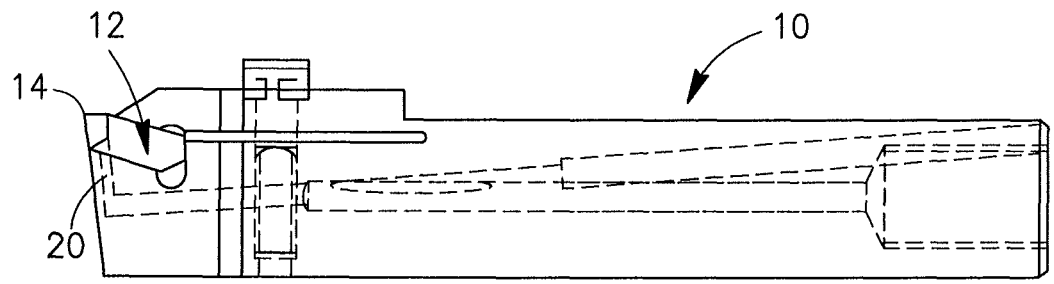
FIG. 3 is a side view of the cutting tool of FIG. 1.
Figure 4:
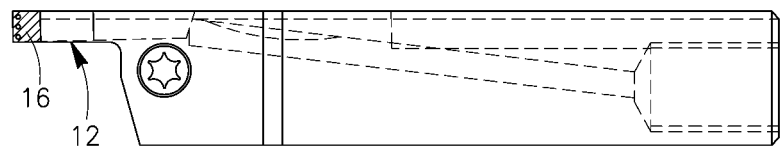
FIG. 4 is a top view of the cutting tool of FIG. 1.
Figure 5:
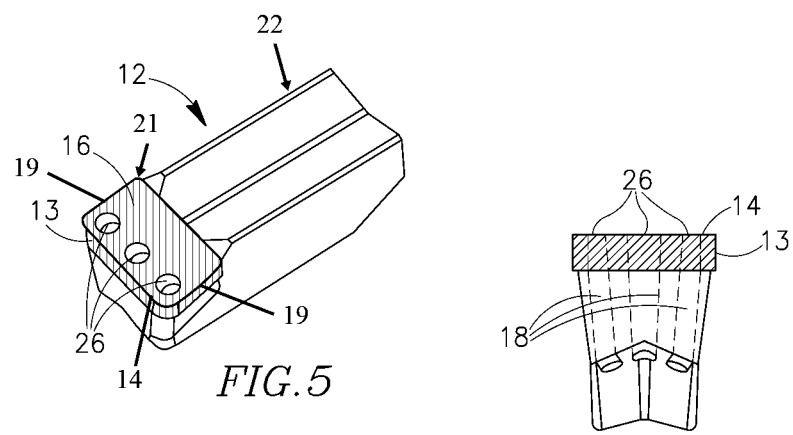
FIG. 5 is a top perspective view of the cutting insert of FIG. 1.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Although some descriptions herein refer to a method and/or to a cutting insert for machining Inconel, the present invention is not limited in this respect. For example, some embodiments of the invention may refer to grooving of other superalloys, of ordinary metal alloys, of high-temperature alloys, of other nickel based alloys, or the like.

Reference is made to FIGS. 1-9, showing various views of a cutting tool 10 having a grooving cutting insert 12 releasably retained therein. The cutting insert 12 includes a cutting portion 21 connected to an elongated body portion 22. The cutting portion 21 is wider than the body portion in a plan view of the cutting portion's rake face 16, and has a front cutting edge 14 which defines a groove width of a groove being formed in the work-piece, during a cutting operation. Side edges 19 extend rearwardly from opposite sides of the front cutting edge 14.

Figure 6:
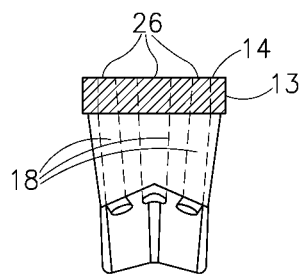
FIG. 6 is a front, partially cut view of the cutting insert of FIG. 5, showing a plurality of interior ducts formed therein.
Figure 7:
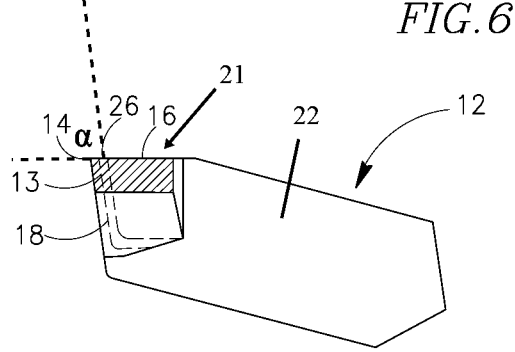
FIG. 7 is a side view of the cutting insert of FIG. 5.
Figure 8:
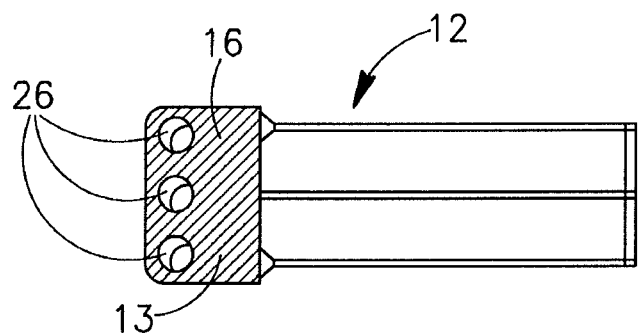
FIG. 8 is a top view of the cutting insert of FIG. 5.

In some embodiments, for example, the cutting insert 12 may be used for grooving superalloys, e.g., Inconel superalloys. At least one portion of the cutting insert 12 is coated with a strengthening Cubic Boron Nitride (CBN) layer 13, for example, a Polycrystalline CBN (PCBN) layer. The at least one portion may include a cutting edge 14 of the cutting insert 12, a rake face 16 thereof, and/or one or more other portions of the cutting insert 12, e.g., associated with the cutting edge 14. As a figurative, non-limiting example, the hatched portion in, e.g., FIGS. 6, 7 and 8 is coated with the CBN layer 13. The CBN layer 13 provides the cutting insert 12 with durability and protection for performing intensive cutting operations, such as grooving superalloys at high cutting speeds, e.g., as described below.

Figure 9:
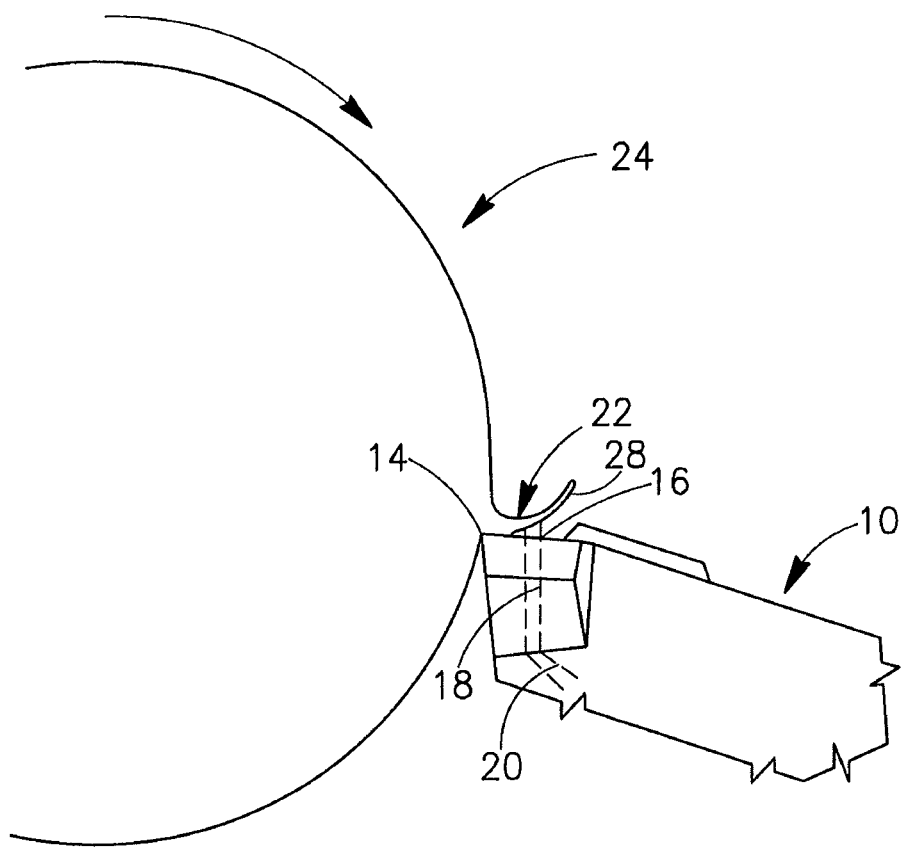
FIG. 9 shows a portion of the cutting tool of FIG. 1, cutting a chip from a grooved workpiece, in accordance with some embodiments of the invention.

In all embodiments the cutting insert 12 includes one or more interior ducts 18 formed therein, the number depending, for example, on the width of the cutting edge 14. As a non-limiting example, a cutting edge having a width of approximately three millimeters or less may have one interior duct, a cutting edge having a width of approximately four millimeters may have two interior ducts, and a cutting edge having a width of approximately six millimeters may have three interior ducts formed therein. The one or more interior ducts 18, receive coolant fluid from an input duct 20 connected thereto, convey corresponding one or more streams of coolant fluid therethrough, to an interaction area 22 between the cutting edge 14 and a work-piece 24 being grooved, e.g., as shown in FIG. 9.

The interior ducts 18 extend upwardly and substantially outwardly, from a general bottom portion of the cutting insert 12, and into the rake face 16 of the cutting insert 12, forming in the rake face 16 one or more respective openings 26. For example, in embodiments in which the rake face 16 is covered with a CBN layer 13, the one or more interior ducts 18 open out to the rake face 16 through the CBN layer 13, forming the respective one or more openings 26 therein, e.g., as shown in FIG. 8.

The openings in the rake face 16 are positioned in the substantial proximity of the cutting edge 14, for coolant fluid directed therethrough to efficiently expel heat from the interaction area 22. For example, the distance of the respective centers of the openings 26 from the cutting edge 14 may range between 0.5 and 3 millimeters. Locating the centers of the openings 26 closer than 0.5 millimeters to the cutting edge 14 may weaken the cutting edge, while locating the openings 26 farther than 3 millimeters may result in either or both inferior cooling of the interaction area 22 and the formation of work-piece chips 28 that are longer than desirable. Although not limited in this respect, in some embodiments the interior ducts 18 may be formed using an electro-erosion manufacturing technique.

In some embodiments, the portion of the rake face 16 in which the openings 26 are formed is substantially flat and devoid of chip forming structures such as ridges and other formations found in numerous prior art cutting inserts. Also, in some embodiments, the terminal portions of the interior ducts 18 proximate the openings 26 in the rake face 16 have a constant diameter, are substantially straight and form an angle α of between 30° and 90° with the rake face 16, in a side view of the cutting insert 12.

Some embodiments include a method of grooving superalloys using the cutting insert 12 described above, and conveying coolant fluid through the interior ducts 18 with a high or a very high pressure, e.g., with a pressure in the range of 200-500 bar. For example, as shown in FIG. 9, the one or more interior ducts 18 and respective openings 26 are oriented such that the respective coolant fluid streams conveyed by the interior ducts 18 are directed in a generally upward direction, in order to directly, and generally perpendicularly, strike the underside of work-piece chips 28 formed during the grooving operation. This allows the directed coolant fluid to "lift" the chips 28, and thus to efficiently break and detach the chips 28 from the work-piece 24.

The method may include grooving superalloys such as Inconel at very high cutting speeds Vc, achieving improved surface quality and chip formation. For example, in some embodiments the method includes grooving a superalloy work-piece, e.g., an Inconel work-piece, with a cutting speed Vc in the range of 200-500 meters per minute. The method may additionally include, for example, grooving a superalloy work-piece with the above-mentioned cutting speeds, while forming work-piece chips having typical lengths of 1-5 millimeters, with at least 90% of work-piece chips falling within this range of lengths. The lengths of work-piece chips 28 are limited by the coolant fluid streams impacting the underside of work-piece chips 28 at high pressures, as the work-piece chips 28 are formed during grooving operations. In the absence of the coolant fluid streams, the lengths of work-piece chips 28 would be longer. In some embodiments, such as when the rake surface 16 is devoid of chip forming structures, the work-piece chips 28 break and detach solely due to the coolant fluid streams impacting the underside of work-piece chips 28.

While the cutting insert 12 is shown in these figures to have only one cutting portion, it is understood that the cutting insert may instead have a plurality of cutting portions and be indexable. Thus, the cutting insert may have two such cutting portions provided on opposite ends of the top surface and thus have 180° rotational symmetry about a first axis passing through the top surface of the cutting insert. Alternatively, the cutting insert may have two diagonally opposite cutting portions and thus have 180° rotational symmetry about a second axis passing through the side surface of the cutting insert, the second axis being perpendicular to the first axis.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A method of grooving a superalloy work-piece (24), the method comprising:

grooving the work-piece (24) to form a groove using a cutting tool configured to hold a cutting insert having a front cutting edge (14) which defines a groove width and a side edge (19) formed on either side of the front cutting edge and extending rearwardly therefrom, with the front cutting edge and both side edges entering the groove during said grooving, the cutting insert (12) at least partially covered with a Cubic Boron Nitride (CBN) layer (13); and directing one or more coolant fluid streams towards an underside of work-piece chips (28) formed during grooving, the one or more coolant fluid streams being directed via one or more respective interior ducts (18) formed in the cutting insert (12), the interior ducts (18) opening out to a rake face (16) of the cutting insert (12) in respective one or more openings (26), and being directed upwardly and outwardly toward an interaction area (22) between the front cutting edge (14) of the cutting insert (12) and the work-piece (24); wherein:

the rake face (16) of the cutting insert is devoid of chip forming structures;

the one or more coolant fluid streams are directed at a pressure of no less than 200 bars so as to limit lengths of work-piece chips (28) formed in the interaction area (22); and the work-piece chips (28) break and detach from the work-piece (24) due to the one or more coolant fluid streams impacting the underside of the work-piece chips (28) as the latter are formed during grooving operations.

2. The method of claim 1, comprising grooving an Inconel work-piece (24).

3. The method of claim 1, wherein the grooving is performed with a cutting speed in the range of 200 and 500 meters per minute.

4. The method of claim 1, wherein the one or more coolant fluid streams strike directly, and generally perpendicularly, the underside of work-piece chips (28) formed during the grooving operation.

5. The method of claim 3, wherein work-piece chips (28) formed during the grooving operation have typical lengths in the range of 1-5 millimeters.

6. The method of claim 1, wherein at least the rake face (16) is covered with the CBN layer (13), and the one or more ducts (18) open out to the rake face (16) through the CBN layer (13), forming the respective one or more openings (26) therein.

7. The method of claim 1, wherein the CBN layer (13) comprises a Polycrystalline CBN layer.

8. The method of claim 1, wherein the coolant fluid streams are directed at a pressure in the range of 200 and 500 bars.

9. A grooving cutting insert (12) for grooving superalloys, comprising:

a cutting portion (21) connected to an elongated body portion (22), the cutting portion being wider than the body portion, in a top view of the cutting portion;

a front cutting edge (14) defining a groove width and a side edge (19) formed on either side of the front cutting edge (14) and extending rearwardly therefrom, the front cutting edge and both side edges configured to enter a groove during a grooving operation;

a layer (13) of Cubic Boron Nitride (CBN) covering at least a portion of the cutting insert (12); and one or more interior ducts (18) formed inside the cutting insert (12), extending upwardly and outwardly from a general bottom portion of the cutting insert (12), and opening into a rake face (16) of the cutting insert (12), forming one or more respective openings (26) in the rake face (16); wherein:

the rake surface is devoid of chip forming structures; and the distance of respective centers of the openings (26) from the front cutting edge (14) of the cutting insert (12) range between 0.5 and 3 millimeters.

10. The grooving cutting insert (12) of claim 9, wherein the CBN layer (13) comprises a Polycrystalline CBN layer.

11. The grooving cutting insert (12) of claim 9, wherein the at least one portion comprises the rake face (16), and the one or more ducts (18) open out to the rake face (16) through the CBN layer (13), forming the one or more openings (26), respectively, therein.

12. The grooving cutting insert (12) of claim 9, wherein terminal portions of the interior ducts (18) proximate the openings in the rake face form an angle between 30°-90° with the rake face (16), in a side view of the cutting insert (12).

13. The grooving cutting insert (12) of claim 9, wherein the cutting insert is indexable and is provided with at least two cutting portions, each portion provided with the layer of CBN (13) and the one or more interior ducts (18).

* * * * *